United States Patent
Kim et al.

(10) Patent No.: US 9,343,739 B2
(45) Date of Patent: May 17, 2016

(54) POSITIVE ACTIVE MATERIAL INCLUDING LITHIUM NICKEL COMPOSITE OXIDE CORE AND COATING LAYER CONTAINING LITHIUM METAL PHOSPHATE AND METAL PHOSPHATE, MANUFACTURING METHOD THEREOF, AND ELECTRODE AND LITHIUM BATTERY CONTAINING THE SAME

(75) Inventors: Chang-Hyuk Kim, Yongin-si (KR);
Do-Hyung Park, Yongin-si (KR);
Seon-Young Kwon, Yongin-si (KR);
Min-Han Kim, Yongin-si (KR);
Ji-Hyun Kim, Yongin-si (KR);
Jeong-Seop Lee, Yongin-si (KR);
Yoon-Chang Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 682 days.

(21) Appl. No.: 13/238,825

(22) Filed: Sep. 21, 2011

(65) Prior Publication Data

US 2012/0141873 A1 Jun. 7, 2012

(30) Foreign Application Priority Data

Dec. 3, 2010 (KR) .................. 10-2010-0122672

(51) Int. Cl.
*H01M 4/131* (2010.01)
*H01M 4/525* (2010.01)
*H01M 10/0525* (2010.01)
(Continued)

(52) U.S. Cl.
CPC ............ *H01M 4/5825* (2013.01); *H01M 4/131* (2013.01); *H01M 4/136* (2013.01); *H01M 4/1391* (2013.01); *H01M 4/1397* (2013.01);
(Continued)

(58) Field of Classification Search
CPC ... H01M 4/131; H01M 4/136; H01M 4/1391; H01M 4/525; H01M 4/5825; H01M 4/1397; H01M 10/052
USPC .............. 429/220, 231.1, 231.3, 231.5, 231.6
See application file for complete search history.

(56) References Cited

U.S. PATENT DOCUMENTS

2002/0110518 A1* 8/2002 Okuda et al. .................. 423/594
2004/0096743 A1 5/2004 Okae et al.
(Continued)

FOREIGN PATENT DOCUMENTS

JP 2002-075368 A 3/2002
JP 3632686 B2 1/2005
(Continued)

OTHER PUBLICATIONS

Eom et al., Dependence of Electrochemical Behavior on Concentration and Annealing Temperature of $Li_xCoPO_4$ Phase-Grown $LiNi_{0.8}Co_{0.16}Al_{0.04}O_2$ Cathode Materials, *J. Electrochem. Soc.* 155 (3) pp. A228-A233 (2008).

(Continued)

*Primary Examiner* — Sean P Cullen
(74) *Attorney, Agent, or Firm* — Knobbe, Martens, Olson & Bear LLP

(57) ABSTRACT

In one aspect, a positive active material is provided that may have increased thermal stability and resistance to capability deterioration due to repeated charging and discharging, a method of manufacturing the same, and a lithium battery that includes the positive active material.

8 Claims, 5 Drawing Sheets

(51) Int. Cl.
  *H01M 4/58* (2010.01)
  *H01M 4/136* (2010.01)
  *H01M 4/1391* (2010.01)
  *H01M 4/1397* (2010.01)
  *H01M 10/052* (2010.01)

(52) U.S. Cl.
  CPC ............ *H01M 4/525* (2013.01); *H01M 10/052* (2013.01); *Y02E 60/122* (2013.01)

(56) References Cited

U.S. PATENT DOCUMENTS

2006/0093911 A1 * 5/2006 Chiga et al. .................. 429/224

2008/0003504 A1 1/2008 Cho et al.

FOREIGN PATENT DOCUMENTS

| | | |
|---|---|---|
| JP | 2007-335245 A | 12/2007 |
| KR | 10-0441520 B1 | 7/2004 |
| KR | 10-2006-0121272 A | 11/2006 |
| KR | 10-2007-0119929 A | 12/2007 |

OTHER PUBLICATIONS

Korean Office Action dated Jan. 9, 2013 for Korean Patent Application No. KR 10-2010-0122672 which corresponds to captioned U.S. Appl. No. 13/238,825.

* cited by examiner

POSITIVE ACTIVE MATERIAL INCLUDING LITHIUM NICKEL COMPOSITE OXIDE CORE AND COATING LAYER CONTAINING LITHIUM METAL PHOSPHATE AND METAL PHOSPHATE, MANUFACTURING METHOD THEREOF, AND ELECTRODE AND LITHIUM BATTERY CONTAINING THE SAME

CROSS-REFERENCE TO RELATED APPLICATIONS

This application claims the benefit of Korean Patent Application No. 10-2010-0122672, filed on Dec. 3, 2010 in the Korean Intellectual Property Office, the disclosure of which is incorporated herein in its entirety by reference.

BACKGROUND

1. Field

One or more embodiments relate to positive active materials, manufacturing methods thereof, and electrodes and lithium batteries containing the same.

2. Description of the Related Technology

Lithium secondary batteries, using an organic electrolyte, provide a high energy density by generating a high discharge voltage that is more than twice that of a battery that uses a alkali aqueous solution.

Lithium batteries including a negative electrode and a positive electrode have been made of materials into which lithium ions may be inserted and from which lithium ions may be detached. Some lithium secondary batteries are manufactured by filling an organic electrolyte or a polymer electrolyte between the negative electrode and the positive electrode. Lithium secondary batteries generate electrical energy through an oxidation reaction and a reduction reaction when lithium ions are inserted into and detached from the negative electrode and the positive electrode.

Some lithium secondary batteries use lithium cobalt oxide ($LiCoO_2$) as a positive active material. However, $LiCoO_2$ is expensive and a stable supply is not ensured. Some lithium secondary batteries have replaced $LiCoO_2$ using an active material including a composite of nickel and manganese.

The positive active materials that have been developed so far do not afford a state of charge, a recovery charge, and thermal stability at satisfactory levels. The present embodiments overcome the above problems as well as provide additional advantages.

SUMMARY

One or more embodiments include a positive active material that has high thermal stability and little degradation despite repeated charging and discharging.

One or more embodiments include a method of manufacturing a positive active material.

One or more embodiments include an electrode for lithium batteries that include a positive active material.

One or more embodiments include a lithium battery that includes a positive active material.

Additional aspects will be set forth in part in the description which follows and, in part, will be apparent from the description, or may be learned by practice of the presented embodiments.

According to one or more embodiments, there is provided a positive active material including a core that includes a lithium nickel-based composite oxide, and a composite coating layer that is formed on a surface of the core and includes lithium metal phosphate and metal phosphate.

According to one or more embodiments, there is provided a method of forming a positive active material including: preparing a mixture that includes a lithium nickel-based composite oxide, a metal salt, and a phosphate; obtaining crystals by stirring the mixture; and heat treating the crystals at a temperature in a range from about 300° C. to about 800° C., wherein a composite coating layer that includes the lithium metal phosphate and the metal phosphate are coated on a surface of the lithium nickel-based composite oxide.

According to one or more embodiments, there is provided a method of manufacturing a positive active material including: preparing a lithium metal phosphate represented by Formula 1 shown below and a metal phosphate represented by Formula 2 shown below; and forming a composite coating layer that includes the lithium metal phosphate and the metal phosphate on a surface of the lithium nickel-based composite oxide by mixing the lithium metal phosphate and the metal phosphate with the lithium nickel-based composite oxide.

  [Formula 1]

where M is at least one metal selected from the group consisting of nickel (Ni), cobalt (Co), manganese (Mn), iron (Fe), copper (Cu), magnesium (Mg), and aluminum (Al).

  [Formula 2]

where M is at least one metal selected from the group consisting of Ni, Co, Mn, Fe, Cu, Mg, and Al.

According to one or more embodiments, there is provided an electrode for a lithium battery that includes the positive active material.

According to one or more embodiments, there is provided a lithium battery that includes the positive active material.

A lithium battery having high thermal stability and little capability degradation despite repeated charges and discharges may be manufactured by employing the positive active material as an positive electrode of the lithium battery.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
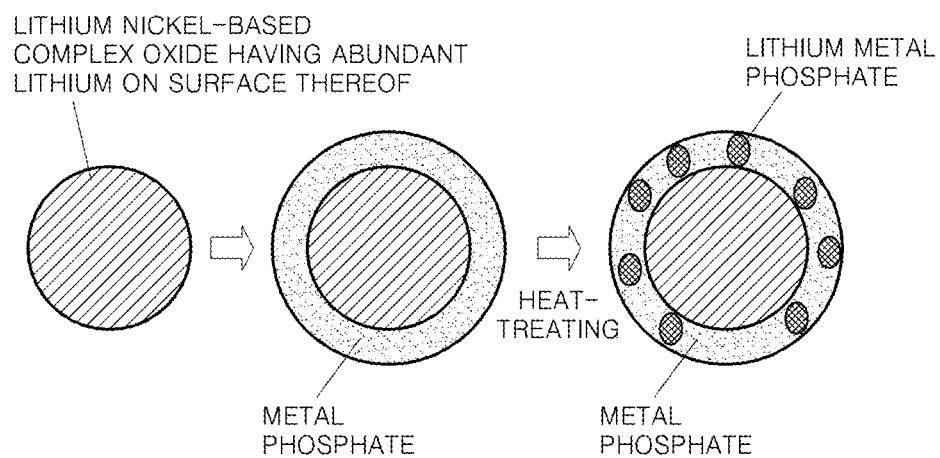
FIG. 1 is a schematic drawing showing a method of manufacturing a positive active material according to an embodiment.

Hereinafter, a positive active material, a method of manufacturing the positive active material, and a lithium battery having a positive active material according to an embodiment will be described in detail with reference to the accompanying drawings.

Some embodiments provide a positive active material including a core that includes a lithium nickel-based composite oxide and a composite coating layer that is formed on a surface of the core and includes a lithium metal phosphate and a metal phosphate.

Some embodiments provide a positive active material that not only maintains the high capacity of the lithium nickel-based composite oxide, but also has high thermal stability and a high charge and discharge capacity since the lithium metal phosphate and the metal phosphate coated on the surface of the core form a structurally stable composite coating layer.

According to an embodiment, the lithium metal phosphate may be represented by Formula 1 as shown below.

$$LiMPO_4 \quad \text{[Formula 1]}$$

In Formula 1, M is at least one metal selected from the group consisting of nickel (Ni), cobalt (Co), manganese (Mn), iron (Fe), copper (Cu), magnesium (Mg), and aluminum (Al).

$$M_3(PO_4)_2 \quad \text{[Formula 2]}$$

In Formula 2, M is at least one metal selected from the group consisting of Ni, Co, Mn, Fe, Cu, Mg, and Al.

Also, the lithium nickel-based composite oxide may be at least one compound selected from the group consisting of compounds represented by Formulae 3 through 7 shown below.

$$Li_aNi_{1-b}Co_bO_{2-c}X_c \quad \text{[Formula 3]}$$

$$Li_aNi_{1-b-c}Co_bM'_cA_p \quad \text{[Formula 4]}$$

$$Li_aNi_{1-b-c}Co_bM'_cO_{2-p}X_p \quad \text{[Formula 5]}$$

$$Li_aNi_{1-b-c}Mn_bM'_cA_p \quad \text{[Formula 6]}$$

$$Li_aNi_{1-b-c}Mn_bM'_cO_{2-p}X_p \quad \text{[Formula 7]}$$

wherein a, b, c, and p respectively satisfy $0.95 \leq a \leq 1.35$, $0 \leq b \leq 0.5$, $0 \leq c \leq 0.5$, and $0 < p \leq 2$, M' is at least one metal selected from the group consisting of Al, Ni, Co, Mn, Cr, Fe, Mg, strontium (Sr), vanadium (V), scandium (Sc), yttrium (Y), and a lanthanide group element, A is at least one component selected from the group consisting of oxygen (O), fluorine (F), sulfur (S), and phosphorous (P), and X is at least one component selected from the group consisting of F, S, and P.

Lithium content at a surface of the core is higher than that of inside thereof to facilitate the formation of a lithium metal phosphate through a reaction between the metal phosphate that constitutes the composite coating layer and the core.

For example, value 'a' may be in a range of $0.95 \leq a \leq 1.35$ so that the surface composition of the core may have a higher lithium content than that included in an overall average composition of compounds represented by Formulae 3 through 7. According to the current embodiment, in the overall average composition of the core, 'a' of the compounds represented by Formulae 3 through 7 may be in a range of $0.95 \leq a \leq 1.07$, more specifically, $0.95 \leq a \leq 1.04$, and further specifically, $0.95 \leq a \leq 1.01$. Further, in the surface composition of the core, 'a' may be in a range of $1.01 \leq a \leq 1.35$, more specifically, $1.04 \leq a \leq 1.35$, and further specifically, $1.07 \leq a \leq 1.35$, so that the surface of the core may have a higher lithium content than that in an overall average composition.

On at least a surface of the core, a portion of lithium is diffused to the outside from where lithium is abundant, and a portion of the diffused lithium remains in the form of lithium hydroxide (LiOH) or lithium carbonate ($Li_2CO_3$) as impurities on the surface of the core. Lithium diffused to the outside and lithium components in the impurities can contribute to the formation of a lithium metal phosphate by reacting with the metal phosphate in a process of forming the composite coating layer. Accordingly, lithium metal phosphate crystals, crystallized through a heat treatment, may be formed in a distributed state in a metal phosphate matrix close to the surface of the core.

At this point, the ratio of compositions of the lithium metal phosphate and the metal phosphate in the composite coating layer may vary according to the amount of lithium that reacts with the metal phosphate and lithium in an impurity state and the amount of metal phosphate.

A total content of the lithium metal phosphate and the metal phosphate may be in a range from about 0.01 to about 50 wt %, more specifically, in a range from about 0.01 to about 20 wt %, and further specifically, in a range from about 0.01 to about 10 wt % based on the total weight of the positive active material. When the total content of the lithium metal phosphate and the metal phosphate lie within the above range, a structurally stable composite coating layer can be formed on the surface of the core, and thus, a positive active material having high thermal stability and a high capacity characteristic may be obtained.

A method of manufacturing a positive active material according to an embodiment will now be described.

The positive active material may be obtained by a sol-gel method using a raw material for forming the positive active material. For example, the method of manufacturing the positive active material includes: preparing a mixture that contains a lithium nickel-based composite oxide, a metal salt, and a phosphate; obtaining crystals by stirring the mixture; and heat treating the crystals at a temperature in a range from about 300° C. to about 800° C. Thus, a positive active material having a composite coating layer that includes a lithium metal phosphate and a metal phosphate on a surface of the lithium nickel-based composite oxide may be obtained.

FIG. 1 is a schematic drawing showing a method of manufacturing a positive active material according to an embodiment. Referring to FIG. 1, after forming a metal phosphate coating layer on a surface of the lithium nickel-based composite oxide having abundant lithium on the surface, a coating layer having a structure in which a lithium metal phosphate is distributed in a metal phosphate matrix by reacting lithium diffused from the lithium nickel-based composite oxide of a core with the metal phosphate through a heat treatment.

More specifically, first, a lithium nickel-based composite oxide, which is a raw material for forming a positive active material, a metal salt, and phosphate are mixed to afford a mixture.

The lithium nickel-based composite oxide may be, for example, at least one material selected from the group consisting of compounds represented by Formulae 3 through 7.

$$Li_aNi_{1-b}Co_bO_{2-c}X_c \quad \text{[Formula 3]}$$

$$Li_aNi_{1-b-c}Co_bM'_cA_p \quad \text{[Formula 4]}$$

$$Li_aNi_{1-b-c}Co_bM'_cO_{2-p}X_p \quad \text{[Formula 5]}$$

$$Li_aNi_{1-b-c}Mn_bM'_cA_p \quad \text{[Formula 6]}$$

$$Li_aNi_{1-b-c}Mn_bM'_cO_{2-p}X_p \quad \text{[Formula 7]}$$

wherein a, b, c, and p respectively satisfy $0.95 \leq a \leq 1.35$, $0 \leq b \leq 0.5$, $0 \leq c \leq 0.5$, and $0 < p \leq 2$, M' is at least one metal selected from the group consisting of Al, Ni, Co, Mn, Cr, Fe, Mg, Sr, V, Sc, Y, and a lanthanide element, A is at least one component selected from the group consisting of O, F, S, and P, and X is at least one component selected from the group consisting of F, S, and P.

In some embodiments, the core may have lithium content at a surface higher than that of inside thereof to facilitate the formation of a lithium metal phosphate through a reaction with the metal phosphate and the lithium nickel-based composite oxide.

In some embodiments, the metal salt may be a nitrate, a sulfate, a carbonate, a chloride, acetate, or a mixture thereof, which includes at least one metal selected from the group consisting of Ni, Co, Mn, Fe, Cu, Mg, and Al. The content of the metal salt may be 0.01 to 10 parts by weight based on 100 parts by weight of the lithium nickel-based composite oxide. In some embodiments, when the content of the metal salt is in the above range, a positive active material finally obtained may have high thermal stability and high capacity characteristics.

In some embodiments, the phosphate may be one selected from the group consisting of ammonium phosphate ($NH_4H_2PO_4$), diammonium phosphate (($NH_4)_2HPO_4$), phosphoric acid ($H_3PO_4$), and a mixture thereof. The content of the phosphate may be from about 0.01 to about 10 parts by weight based on 100 parts by weight of the lithium nickel-based composite oxide. In some embodiments, when the content of the phosphate is in the above range, a positive active material finally obtained may have high thermal stability and high capacity characteristics.

The solvent that is used in the mixture is not specifically limited, and thus, any solvent that is used in the art may be used. For example, the solvent may be a protic solvent. In some embodiments, the solvent may be isopropanol, butanol, ethanol or methanol. In a typical embodiment, the solvent may be ethanol or methanol.

In some embodiments, the mixture may be further treated with a lithium salt such as lithium sulfate or lithium acetate. In some embodiments, an amount of the lithium metal phosphate formed on a surface of a core may be controlled by the addition of a lithium salt.

In some embodiments, the order of mixing the components in the mixture that includes a raw material for forming a positive active material can be varied according to the desired application. In one embodiment, a metal salt and a phosphate can be mixed to provide a first mixture and then the lithium nickel-based composite oxide may be mixed with the first mixture to provide a final mixture. In another embodiment, a lithium nickel-based composite oxide and a phosphate can be mixed to provide a first mixture and then a metal salt may be mixed with the first mixture to provide a final mixture. In another embodiment, a lithium nickel-based composite oxide and a metal salt can be mixed to provide a first mixture and then a phosphate may be mixed with the first mixture to provide a final mixture. This is because acidities of the metal salt and the phosphate are different from each other and therefore a surface modification of a core may vary according to a material that firstly appears on the surface of the core of the lithium nickel-based composite oxide, which results in surface characteristics such as particle size and uniformity of the coating layer.

A primary coating layer is formed on a surface of a lithium nickel-based composite oxide core after stirring the mixture at room temperature, for example, in a range from about 10° C. to about 30° C. The mixture is sufficiently stirred for about 1 to about 6 hours. When crystals obtained as described above are filtered and dried, a powder state lithium nickel-based composite oxide on which the metal phosphate is coated on a surface thereof may be obtained.

Next, the powder state crystals obtained as described above are heat treated.

In some embodiments, the heat treatment temperature may be in a range from about 300° C. to about 800° C., and more specifically, in a range from about 500° C. to about 700° C. Through the heat treatment in the temperature range described above, the coating layer coated on the surface of the lithium nickel-based composite oxide may be synthesized to a composite of a lithium metal phosphate and a metal phosphate.

According to an embodiment, in order to reduce process cost and time incurred due to the heat treatment in the method of manufacturing a positive active material, the lithium metal phosphate and the metal phosphate are prepared in advance, thereby simplifying the process and reducing time and costs.

It is confirmed through an embodiment that the positive active material manufactured according to the method described above has a high capacity equal to or greater than about 160 mAh/g, for example, a high capacity in a range from about 160 mAh/g to about 185 mAh/g, and has high thermal stability.

Hereinafter, a lithium battery according to an embodiment will be described.

A positive electrode of the lithium battery may include the positive active material described above, and the lithium battery may be manufactured as follows.

First, the positive electrode may be formed by, for example, a method in which a positive electrode mixture that includes the positive active material and a binder is molded to a predetermined shape, or a method in which the positive electrode mixture is coated on a current collector such as a copper foil or an aluminum foil.

For example, a positive electrode mixture in which a positive active material, a conductive material, a binder, and a solvent are mixed is formed. A positive electrode plate may be obtained by directly coating the positive electrode mixture on an aluminum foil current collector. Alternatively, after casting the positive electrode mixture on an additional supporter, a positive active material film is obtained by separating the positive electrode mixture from the supporter. Afterwards, the positive active material film is laminated on an aluminum foil current collector, and thus, a positive electrode plate is obtained. The positive electrode according to the current embodiment is not limited to the positive electrode described above, and may be another type of positive electrode.

In some embodiments, conductive material may be carbon black or fine graphite particles. In some embodiments, binder may be one selected from the group consisting of vinylidene fluoride/hexafluoropropylene co-polymer, polyvinylidene fluoride (PVDF), polyacrylonitrile, polymethylmethacrylate, polytetrafluoroethylene, and a mixture thereof, or styrene butadiene rubber polymer. In some embodiments, the solvent may be N-methylpyrrolidone, acetone, or water. In some embodiments, thecontents of the positive active material, the conductive material, the binder, and the solvent may be levels that are generally used in lithium batteries.

Next, a negative electrode mixture is formed by mixing a negative active material, a conductive material, a binder, and a solvent. In some embodiments, a negative electrode plate may be obtained by directly coating the negative electrode mixture on a copper current collector. Alternatively, after casting the negative electrode mixture on an additional supporter, a negative active material film is obtained by exfoliating the negative electrode mixture from the supporter. Afterwards, the negative active material film is laminated on a copper current collector, and thus, a negative electrode plate is obtained. In some embodiments, contents of the negative active material, the conductive material, the binder, and the solvent may be levels that are generally used in lithium batteries.

In some embodiments, the negative active material may be lithium, a lithium alloy, a carbon material, or graphite. In some embodiments, in the negative electrode mixture, the same conductive material, the binder, and the solvent used to form the positive electrode mixture may be used. In some embodiments, pores may be formed in the positive electrode and negative electrode plates by further adding a plasticizer to the positive electrode mixture and the negative electrode mixture.

In some embodiments, the positive electrode and the negative electrode may be separated by a separator, and the separator may be any separator that may be generally used in lithium batteries. In some embodiments, the separator may have a low resistance to ion mobility of an electrolyte and a high moisturizing capability. For example, the separator may be one selected from the group consisting of glass fiber, polyester, polyethylene, polypropylene, polytetrafluoroethylene, or a combination thereof in a woven fabric type or a non-woven fabric type. In a typical embodiment, the a separator that may be wound, such as polyethylene or polypropylene is used for a lithium ion battery, and a separator having a high impregnation capability of an organic electrolyte is used for a lithium ion polymer battery. The separators may be manufactured, for example, by using the following methods.

In some embodiments, after preparing a separator composite by mixing a polymer resin, a filler, and a solvent, a separator film may be formed by directly coating the separator composite on an electrode and drying it. Alternatively, after casting the separator composite on a supporter and drying it, a separator film separated from the supporter may be laminated on the electrode.

The polymer resin according to the current embodiment is not specifically limited, and thus, all binding materials that are used for binding electrode plates are available. For example, the polymer resin may be one selected from the group consisting of vinylidene fluoride/hexafluoropropylene co-polymer, polyvinylidene fluoride (PVDF), polyacrylonitrile, polymethylmethacrylate, and a mixture thereof.

The electrolyte may be formed by dissolving a material selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are integers), LiCl, LiI, and a mixture thereof in a solvent selected from the group consisting of propylene carbonate, ethylene carbonate, fluoroethylene carbonate, butylcarbonate, dimethylcarbonate, diethylcarbonate, methylethylcarbonate, methylpropylcarbonate, ethylpropylcarbonate, methylisoporpylcarbonate, diproplycarbonate, dibutylcarbonate, benzonitrile, acetonitrile, tetrahydrofuran, 2-methyltetrahydrofuran, γ-butyrolactone, dioxolane, 4-methyl dioxolane, N,N-dimethylformamide, dimethylacetamide, dimethyl sulfoxide, dioxane, dimethoxyethane, sulfolane, dichloroethane, dichlorobenzene, nitrobenzene, diethylneneglycol, dimethylether, and a mixture thereof.

A battery structure is formed by disposing the separator between the positive electrode plate and the negative electrode plate. After the battery structure is accommodated in a cylindrical battery case or a polygonal battery case by winding or folding, when an organic electrolyte is filled in the battery case, the manufacture of the lithium ion battery is completed.

Hereinafter, examples of one or more embodiments will be described in detail including comparative examples. However, these examples are not intended to limit the scope of the one or more embodiments.

Example 1

After dissolving 6 g of cobalt sulfate ($CoSO_4$) and 3 g of diammonium phosphate ($(NH_4)_2HPO_4$ in 200 mL of deionized water, a mixture was formed by mixing 100 g of a lithium nickel-based composite oxide having an overall average composition of $Li_{1.00}Ni_{0.5}Co_{0.2}Mn_{0.3}O_2$ and a surface composition of $Li_{1.09}Ni_{0.53}Co_{0.19}Mn_{0.28}O_2$ in the deionized water. The mixture was stirred for 6 hours at room temperature. A powder state of a precipitate in which cobalt phosphate ($Co_3(PO_4)_2$) was coated on a surface of the lithium nickel-based composite oxide was obtained by filtering the mixture in which the precipitate was generated and drying it. The powder was heat treated at a temperature of 650° C. for 7 hours. Thus, a positive active material in which $LiCoPO_4$ and $Co_3(PO_4)_2$ were coated on the surface of the lithium nickel-based composite oxide was obtained.

Example 2

A positive active material was formed by using the same process used to form the positive active material in Example 1 except that a mixture was prepared by mixing a solution in which 6 g of $CoSO_4$ and 100 g of a lithium nickel-based composite oxide having an overall average composition of $Li_{1.00}Ni_{0.5}Co_{0.2}Mn_{0.3}O_2$ and a surface composition of $Li_{1.09}Ni_{0.53}Co_{0.19}Mn_{0.28}O_2$ were mixed in 150 mL of deionized water and a solution in which 3 g of $(NH_4)_2HPO_4$ was dissolved in 50 g of deionized water.

Example 3

A positive active material was formed by using the same process used to form the positive active material in Example 1 except that a mixture was prepared by mixing a solution in which 3 g of $(NH_4)_2HPO_4$ and 100 g of a lithium nickel-based composite oxide having an overall average composition of $Li_{1.00}Ni_{0.5}Cu_{0.2}Mn_{0.3}O_2$ and a surface composition of $Li_{1.09}Ni_{0.53}Co_{0.19}Mn_{0.28}O_2$ were mixed in 150 mL of deionized water and a solution in which 3 g of $CoSO_4$ was dissolved in 50 g of deionized water.

Example 4

After forming a mixture in which 0.02 g of $LiCoPO_4$ 0.02 g, 0.01 g of $Co_3(PO_4)_2$, and 100 g of a lithium nickel-based composite oxide having an overall average composition of $Li_{1.00}Ni_{0.5}Co_{0.2}Mn_{0.3}O_2$ and a surface composition of $Li_{1.09}Ni_{0.53}Co_{0.19}Mn_{0.28}O_2$ were mixed in 200 mL of deionized water, the mixture was stirred for 6 hours and then filtered. Thus, a positive active material in which $LiCoPO_4$ and $Co_3(PO_4)_2$ were coated on a surface of the lithium nickel-based composite oxide was formed.

Examples 5 Through 8

Positive active materials were manufactured using the same processes used to form the positive active material in Examples 1 through 4 except that a lithium nickel-based composite oxide having an overall average composition of $Li_{1.05}Ni_{0.6}Co_{0.2}Mn_{0.2}O_2$ was used in Examples 5 through 8.

Examples 9 Through 12

Positive active materials were manufactured using the same processes used to form the positive active material in Examples 1 through 4 except that the lithium nickel-based composite oxide having an overall average composition of $Li_{1.05}Ni_{0.5}Co_{0.2}Mn_{0.3}O_2$ was used in Examples 9 through 12.

Comparative Examples 1 Through 12

In the comparative examples 1 through 12, positive active materials in which $Co_3(PO_4)_2$ was coated on a surface of the lithium nickel-based composite oxide were formed without performing the heat treatment processes performed in Example 1 through 12.

Figure 2:
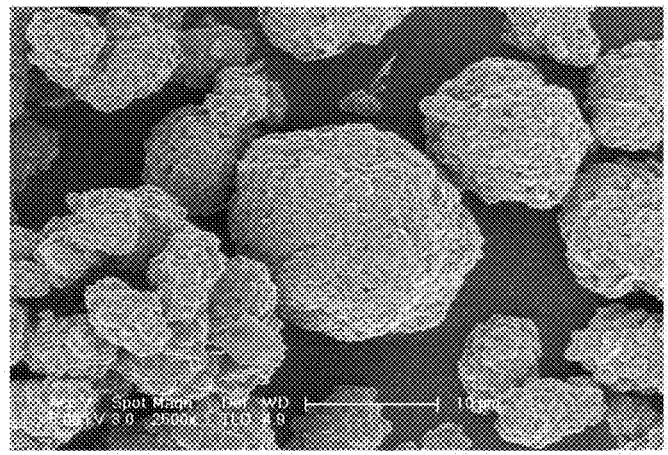
FIG. 2 is a scanning electron microscope (SEM) image of the positive active material according to Example 1.
Figure 3:
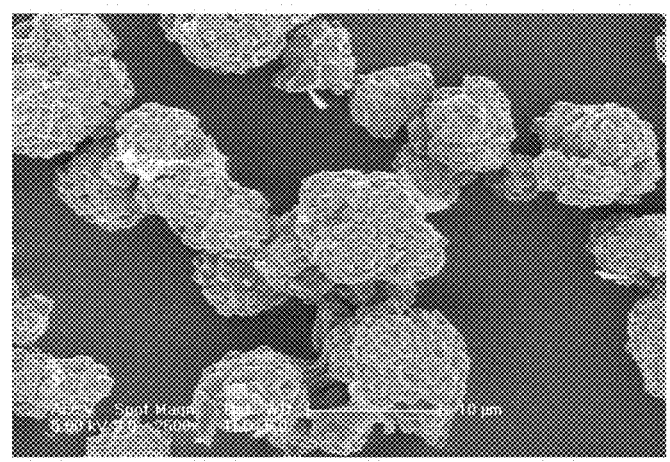
FIG. 3 is a SEM image of the positive active material according to Example 2.
Figure 4:
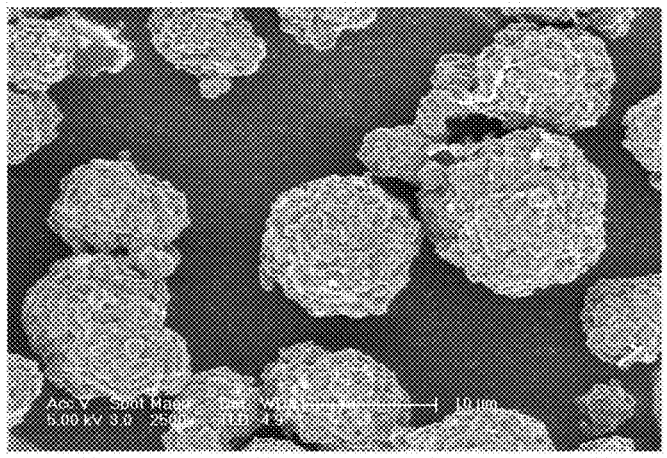
FIG. 4 is a SEM image of the positive active material according to Example 3.

The positive active materials formed according to Example 1 through 3 were investigated by magnifying them 40,000 times using a scanning electron microscope (SEM), and the results are shown in FIGS. 2 through 4. Referring to FIGS. 2 through 4, it is seen that the coating states are different from each other according to the process for coating the lithium metal phosphate on the positive active materials. In the case of Example 3 in which phosphate was added in advance, and then, the mixture was stirred, particles relatively small in size were uniformly coated on a surface of the core. That is, Example 3 shows excellent surface characteristic. Example 2, in which the metal salt was added in advance and stirred, shows the next most favorable surface characteristic.

Example 13

Positive Electrode and Manufacturing a Lithium Battery Using the Positive Electrode After uniformly mixing the positive active material powder formed in Example 1 and a carbon conductive material (Ketjen Black; EC-600JD) at a weight ratio of 94:3, a slurry having a weight ratio of active material:carbon conductive material:binder of 94:3:3 was formed by adding a binder solution of polyvinylidene fluoride (PVDF).

A positive electrode plate was formed by coating the positive active material on an aluminum foil having a thickness of 15 μm and drying it. A coin cell (CR2016 type) having a diameter of 12 mm was manufactured after additionally vacuum drying the positive electrode plate.

When the cell was manufactured, metal lithium was used as a counter electrode, and a solution in which 1.15M $LiPF_6$ was dissolved in a mixture solvent having a volume ratio of ethylene carbonate (EC):diethylcarbonate (DEC):dimethylcarbonate (DMC) of 3:3:4 was used as an electrolyte. A plurality of the lithium batteries were manufactured.

Comparative Example 13

A lithium battery was manufactured using the same method as used in Example 13 except that the positive active material formed in the Comparative example 1 was used.

Comparative Example 14

A lithium battery was manufactured using the same method as used in Example 13 except that the positive active material formed in the Comparative example 2 was used.

Charge and Discharge Test of the Coil Cell

Evaluation Example 1

The coin cell batteries manufactured according to Example 13 and the Comparative examples 13 and 14 were charged with a constant current of 125 mA/g until the voltage of the coin cell batteries reached 4.3V (vs. Li). When the voltage reached 4.3 V, the coin cell batteries were charged with a constant voltage of 4.3V until the constant current was reduced to 1/10 of the initial value. Afterwards, the coin cell batteries were respectively discharged with a constant current of 50 mA/g until the voltage of the coin cell batteries reached 3V (vs. Li), and discharge capacities were measured. The charging and discharging were performed three times.

In a fourth cycle, the coin cell batteries were charged with a constant current of 125 mA/g and a constant voltage of 4.3V until the voltage of the coin cell batteries reached 4.3 V (vs. Li). Afterwards, the coin cell batteries were discharged with a constant current of 25 mA/g (0.1 C rate) until the voltage reached 3 V (vs. Li).

In a fifth cycle, the coin cell batteries were charged with a constant current of 125 mA/g and a constant voltage of 4.3V until the voltage of the coin cell batteries reached 4.3 V (vs. Li). Afterwards, the coin cell batteries were discharged with a constant current of 250 mA/g (1 C rate) until the voltage of the coin cell batteries reached 3V (vs. Li).

In 6th through 50th cycles, the coin cell batteries were charged with a constant current of 125 mA/g and a constant voltage of 4.3V until the voltage of the coin cell batteries reached 4.3 V (vs. Li). Afterwards, the coin cell batteries were discharged with a constant current of 125 mA/g (0.5 C rate) until the voltage of the coin cell batteries reached 3V (vs. Li).

The above charge and discharge tests were performed at a room temperature of 25° C.

Measuring results are summarized in Table 1. An initial coulombic efficiency is expressed as Equation 1 shown below. A high rate discharge characteristic is expressed as a discharge rate capability (1 C/0.1 C) of Equation 2 shown below. A retention ratio is expressed as Equation 3 shown below.

$$\text{Initial coulombic efficiency [\%]}=[\text{Discharge capability at }1^{st}\text{ cycle/Charge capability at }1^{st}\text{ cycle}]\times 100 \quad \text{<Equation 1>}$$

$$\text{Discharge rate capability [\%]}=[\text{Discharge capability at 1 C rate/Discharge capability at 0.1 C rate}]\times 100 \quad \text{<Equation 2>}$$

$$\text{Retention ratio [\%]}=[\text{Discharge capability at 50th cycle/Discharge capability at }1^{st}\text{ cycle}]\times 100 \quad \text{<Equation 3>}$$

TABLE 1

| | Initial coulombic efficiency [%] | Discharge rate capability [%] | Retention ratio [%] |
|---|---|---|---|
| Example 13 | 90 | 88 | 90 |
| Comparative example 13 | 87 | 86 | 85 |
| Comparative example 14 | 86 | 85 | 85 |

As shown in Table 1, the lithium battery according to Example 9 has increased initial coulombic efficiency, high rate discharge characteristics (discharge rate capability), and an increased cycle lifetime (retention ratio).

Thermal Stability Test of Positive Active Material

Evaluation Example 2

Coin cell batteries manufactured according to Example 13 and the comparative example 13 were charged with a constant current of 0.1 C CC/CV until the voltage of the coin cell batteries reached 4.3V (vs. Li). When the voltage reached 4.3

V, the coin cell batteries were charged with a constant voltage of 4.3V until the constant current was reduced to 1/10 of the initial value. Afterwards, the thermal stability of the coin cell batteries were evaluated by taking a composite from a positive electrode plate by disassembling the coin cell batteries in a dry room being careful that no interference between two plates may take place. Differential scanning calorimetry (DSC) was used to evaluate the thermal stability of the compound, and a calorific value generated from a reaction between a positive electrode material in the compound and the electrolyte was measured by converting with respect to a unit mass.

The charge and discharge tests were performed at a room temperature of 25° C.

A positive active material was extracted from the coin cell batteries after destroying the charged coin cell batteries, and DSC analysis was performed. The analysis results are shown in FIGS. 5 and 6.

Figure 5:
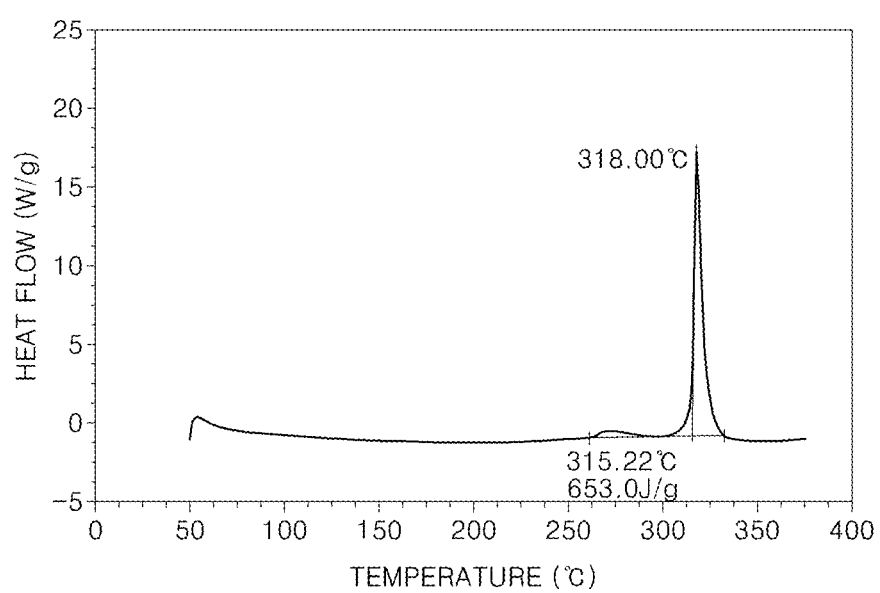
FIG. 5 is a result of differential scanning calorimetric (DSC) analysis of a lithium battery manufactured according to Example 13.
Figure 6:
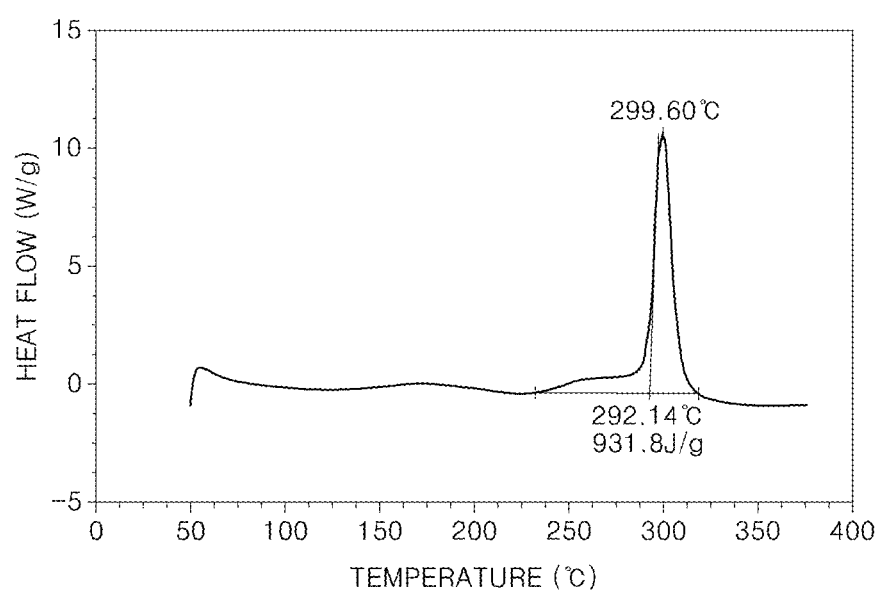
FIG. 6 is a result of DSC analysis of a lithium battery manufactured according to comparative example 13.

Referring to FIGS. 5 and 6, the positive active material formed in Example 1 that is used in the lithium battery manufactured according to Example 13 has increased thermal stability when compared to the positive active material in the Comparative example 1 that is used in the lithium battery manufactured according to the Comparative example 13.

As described above, the positive electrode active material of the embodiments of the present invention has high thermal stability and reduces capacity deterioration despite repeated charging and discharging.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A positive active material comprising:
a core comprising a lithium nickel-based composite oxide; and
a composite coating layer formed on a surface of the core, the composite coating layer comprising lithium metal phosphate and metal phosphate, wherein lithium content at the surface of the core is higher than lithium content inside the core and the surface of the core has a surface composition, and
wherein the surface composition of the core comprises at least one compound selected from the group consisting of compounds represented by Formulae 6 and 7-shown below:

$$Li_aNi_{1-b-c}Mn_bM'_cA_p$$ [Formula 6]

$$Li_aNi_{1-b-c}Mn_bM'_cO_{2-p}X_p$$ [Formula 7]

wherein in Formula 6, a, b, c, and p respectively satisfy 1.01≤a≤1.35, 0<b≤0.5, 0<c≤0.5, and 0<p≤2, M' is selected from the group consisting of Co, Cr, Mg, strontium (Sr), vanadium (V), scandium (Sc), yttrium (Y), and a lanthanide element, A is at least one component selected from the group consisting of oxygen (O), fluorine (F), sulfur (S), and phosphorus (P),
wherein in Formula 7, a, b, c, and p respectively satisfy 1.01≤a≤1.35, 0<b≤0.5, 0<c≤0.5, and 0<p<2, M' is selected from the group consisting of Al, Co, Cr, Fe, Mg, strontium (Sr), vanadium (V), scandium (Sc), yttrium (Y), and a lanthanide element, and X is at least one component selected from the group consisting of fluorine (F), sulfur (S), and phosphorus (P).

2. The positive active material of claim 1, wherein the lithium metal phosphate is represented by Formula 1 and the metal phosphate is represented by Formula 2, $$LiMPO_4$$ [Formula 1]

where M is selected from the group consisting of nickel (Ni), cobalt (Co), manganese (Mn), iron (Fe), copper (Cu), magnesium (Mg), and aluminum (Al), $$M_3(PO_4)_2$$ [Formula 2]

where M is selected from the group consisting of Ni, Co, Mn, Fe, Cu, Mg, and Al.

3. The positive active material of claim 1, wherein the lithium metal phosphate is adjacent to the surface of the core in the composite coating layer.

4. The positive active material of claim 1, wherein the core comprises at least one compound selected from the group consisting of compounds represented by Formulae 6 and 7,
wherein, a, b, c, and p respectively satisfy 0.95≤a<1.01, 0<b≤0.5, 0≤c≤0.5, and 0<p≤2,
wherein in Formula 6, M' is selected from the group consisting of Co, Cr, Mg, strontium (Sr), vanadium (V), scandium (Sc), yttrium (Y), and a lanthanide element, A is at least one component selected from the group consisting of oxygen (O), fluorine (F), sulfur (S), and phosphorus (P),
wherein in Formula 7, M' is selected from the group consisting of Al, Co, Cr, Fe, Mg, strontium (Sr), vanadium (V), scandium (Sc), yttrium (Y), and a lanthanide element, and X is at least one component selected from the group consisting of fluorine (F), sulfur (S), and phosphorus (P).

5. The positive active material of claim 1, wherein the total content of the lithium metal phosphate and the metal phosphate is in a range from about 0.01 to about 50 weight % based on the total weight of the positive active material.

6. An electrode for a lithium battery comprising the positive active material of claim 1.

7. A lithium battery comprising the positive active material of claim 1.

8. The lithium battery of claim 7, wherein the core of the positive active material comprises at least one compound having a formula selected from the group consisting of compounds represented by Formulae 6 and 7,
wherein a, b, c, and p respectively satisfy 0.95≤a<1.01, 0<b≤0.5, 0≤c≤0.5, and 0<p≤2,
wherein in Formula 6, M' is selected from the group consisting of Co, Cr, Mg, strontium (Sr), vanadium (V), scandium (Sc), yttrium (Y), and a lanthanide element, A is at least one component selected from the group consisting of oxygen (O), fluorine (F), sulfur (S), and phosphorus (P),
wherein in Formula 7, M' is selected from the group consisting of Al, Co, Cr, Fe, Mg, strontium (Sr), vanadium (V), scandium (Sc), yttrium (Y), and a lanthanide element, and X is at least one component selected from the group consisting of fluorine (F), sulfur (S), and phosphorus (P).

* * * * *